United States Patent [19]

Pastorek

[11] Patent Number: 4,623,492
[45] Date of Patent: Nov. 18, 1986

[54] AERATOR FOR LIQUIDS
[75] Inventor: Konrad Pastorek, Sollenau, Austria
[73] Assignee: Overhoff Ges m.b.H., Leobersdorf, Austria
[21] Appl. No.: 757,303
[22] Filed: Jul. 22, 1985
[30] Foreign Application Priority Data
  Jul. 23, 1984 [AT] Austria .................... A 2369/84
[51] Int. Cl.⁴ ............................................. B01F 3/04
[52] U.S. Cl. ....................................... 261/92; 210/150
[58] Field of Search ................... 261/92, 120; 210/150,
    210/242.2, 619, 151; 435/312; 209/168, 169

[56] References Cited
U.S. PATENT DOCUMENTS

| | | | |
|---|---|---|---|
| 1,899,504 | 2/1933 | Hanson | 261/92 |
| 3,510,111 | 5/1970 | Hochmuth | 261/92 X |
| 3,773,306 | 11/1973 | Duquet | 261/92 |
| 3,827,559 | 8/1974 | Gass et al. | 261/92 X |
| 3,886,074 | 5/1975 | Prosser | 261/92 X |
| 3,904,525 | 9/1975 | Rosenberg | 261/92 X |
| 3,956,127 | 5/1976 | Holmberg | 261/92 X |
| 3,960,991 | 6/1976 | Schmitt et al. | 261/92 |
| 4,267,051 | 5/1981 | Uhlmann | 261/92 X |
| 4,364,826 | 12/1982 | Kato | 261/92 X |

FOREIGN PATENT DOCUMENTS 2638665 3/1978 Fed. Rep. of Germany .
552457 4/1943 United Kingdom ............... 261/92

Primary Examiner—Richard L. Chiesa
Attorney, Agent, or Firm—Fleit, Jacobson, Cohn & Price

[57] ABSTRACT

An aerator for liquids, particularly an aerator for water, includes at least one aerating basin and a plurality of immersible elongate bodies, which are contained in said basin and secured to the peripheries of wheels, which revolve about an axis that is parallel to the surface of the liquid in the aerating basin. As a result, each immersible body emerges entirely out of the liquid on one side of the aerating basin and is entirely immersed into said liquid on the other side of the basin. Each immersible body comprises a plurality of axially aligned discs, which have webs provided at their rim with a peripherally and axially extending edge flange so that a chamber is defined between adjacent discs. Each edge flange is formed with a slot in a portion which faces downwardly as it enters the liquid.

19 Claims, 8 Drawing Figures

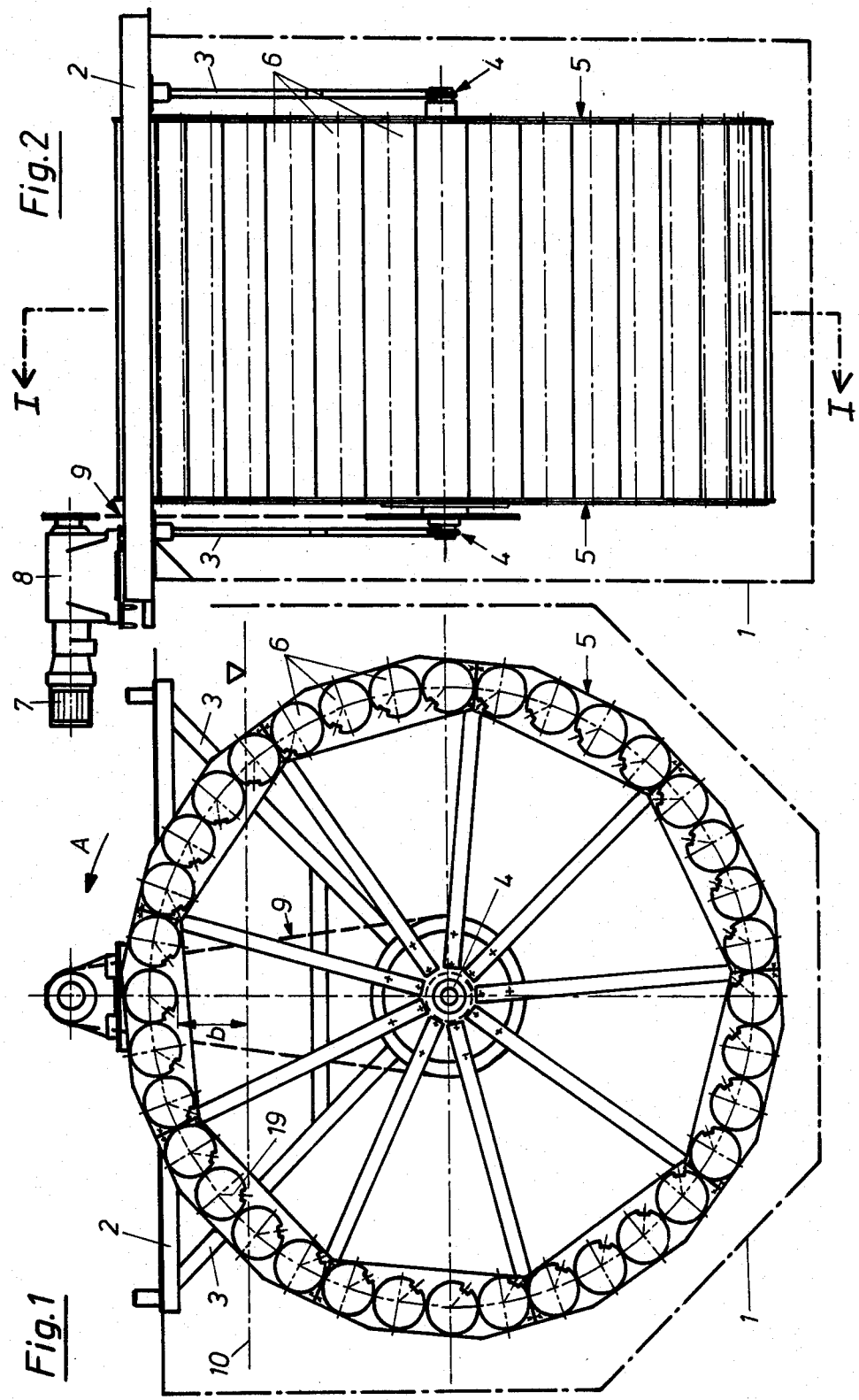

AERATOR FOR LIQUIDS

SUMMARY OF THE INVENTION

It is an object of the invention to provide an improved immersible body which is adapted to introduce a larger quantity of air into the sewage and which has an overall length which can be varied in a simple manner.

In an apparatus of the kind described first hereinbefore this is accomplished in accordance with the invention in that each immersible body consists of a plurality of axially aligned discs, which are provided at their rims with axially and peripherally extending flanges so that a chamber is defined between adjacent discs, and each flange is formed with a slot in a portion which faces downwardly as the immersible body is entering the liquid.

BACKGROUND OF THE INVENTION

1. Field of the Invention

This invention relates to an aerator for liquids, particularly to an aerator for water, comprising at least one aerating basin, which contains a plurality of immersible elongate bodies, which are secured to the peripheries of wheels which revolve about an axis that is parallel to the surface of the liquid in the aerating basin so that each of the immersible bodies emerges entirely out of the liquid on one side of the aerating basin and is entirely immersed into the liquid on the other side of said basin, wherein the immersible bodies define internal cavities, which communicate with the outside of the immersible bodies through openings formed in the walls of said bodies. The aerator is mainly intended for aerating contaminated water, such as sewage.

2. Description of the Prior Art

An aerator of that kind has been disclosed in Published German Application No. 2638665. In that aerator the immersible bodies consist of elongate tubes having any desired shape in cross-section and formed in their walls with apertures extending around two-thirds of the periphery of the tube. The apertures are so arranged that they face upwardly as the tube is emerging out of the liquid and face downwardly as the tube is immersed into the liquid. The active surface is increased by the provision of discs, which have been mounted in the tubes and permit the growth of microorganisms in a film of activated sludge on said discs.

Hence, the invention provides an aerator for liquids, particularly an aerator for water, which comprises at least one aerating basin, which contains a plurality of immersible elongate bodies, which are secured to the peripheries of wheels, which revolve about an axis which is parallel to the surface of the liquid in the aerating basin so that each of the immersible bodies emerges entirely out of the liquid on one side of the aerating basin and is entirely immersed into the liquid on the other side of that basin. Each immersible body consists of a plurality of axially aligned discs, each of which is provided at its rim with a peripherally and axially extending flange so that a chamber is defined between adjacent discs, and each flange is formed with a slot in a portion which faces downwardly as the immersible body enters the liquid.

The portion formed with the slot preferably faces vertically downwardly as the immersible body enters the liquid. The term "faces vertically downwardly" means that said portion faces in a direction which deviates from the vertical by not more than 5°.

The slot preferably subtends an arc of 5 to 25 degrees. Further features and details of the invention will now be described with reference to the drawings.

BRIEF DESCRIPTION OF THE DRAWINGS

FIG. 1 is a transverse sectional view taken on line I—I in FIG. 2 and showing an aerator.

FIG. 2 is a diagrammatical side elevation showing the aerator of FIG. 1.

DETAILED DESCRIPTION OF THE PREFERRED EMBODIMENTS

Figure 3:
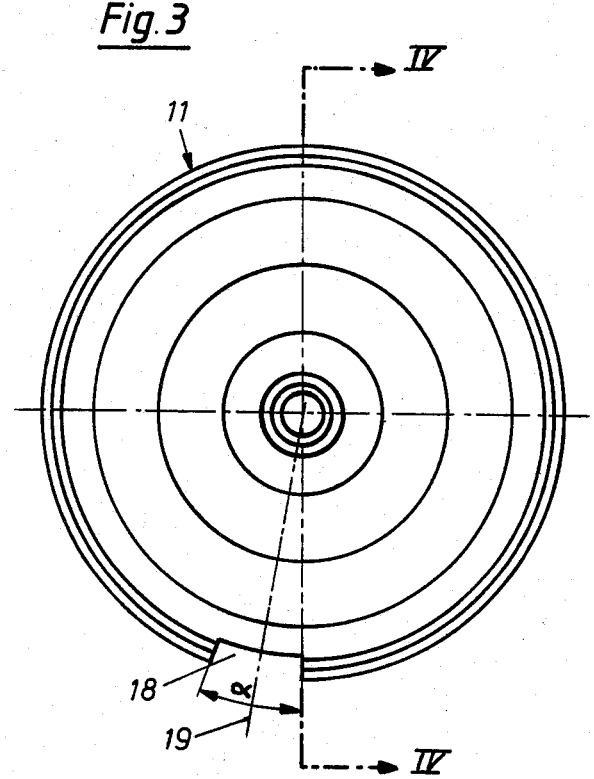
FIG. 3 is a front elevation showing a disc for use in immersible body in accordance with the invention.

FIGS. 1 and 2 show an aerating basin 1, which is diagrammatically indicated in phantom. A frame 2 is provided at the rim of the aerating basin 1 and carries two downwardly directed, V-shaped brackets 3, each of which is provided at its lower end with a bearing 4. Two wheels 5 are rotatably mounted in the bearings 4 and are provided at their peripheries with immersible elongate bodies 6, each of which extends between the two wheels 5. A drive motor 7 is secured to the frame 2 and through the intermediary of a speed reducing transmission 8 and a chain drive 9 drives the wheels 5 so that the immersible bodies 6 revolve in the aerating basin 1 in the sense indicated by the arrow A in FIG. 1 and in the upper portion of the aerating basin 1 emerge entirely out of the liquid, the surface of which is designated 10.

FIG. 3 is a front elevation showing an individual disc 11. In accordance with FIG. 4, a plurality of such discs 11 are axially aligned to form an immersible body 6. Each disc 11 is preferably circular but its contour may have any desired other configuration, e.g., that of a polygon. All discs 11 have preferably the same shape. Each disc comprises a hub 12 and a web 13, which is provided at its rim with an axially and peripherally extending edge flange 14. In the embodiment shown by way of example, the hub 12 and the edge flange 14 are step-shaped so that each disc can be fitted on another like a cover is on a can. The edge flanges 14 hold the discs 11 spaced apart so that adjacent discs 13 define chambers 15.

Figure 4:
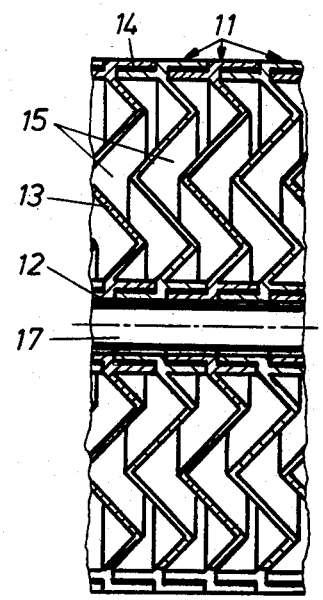
FIG. 4 is a transverse sectional view taken on line IV—IV in FIG. 3.
Figure 5:
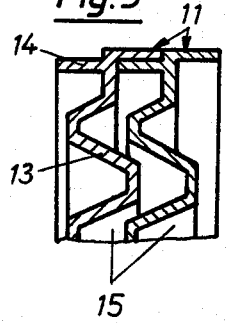
FIGS. 5 to 7 show additional cross-sectional shapes of discs in accordance with the invention.
Figure 6:
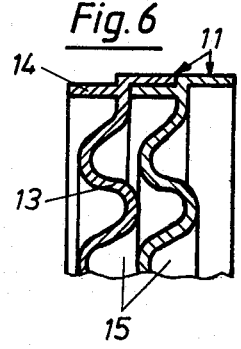
Figure 7:
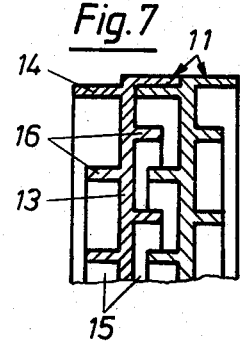

In order to increase the active surface defining the chambers 15, the webs 13 shown in FIG. 4 are zig-zag shaped in cross-section. Webs 13 having other cross-sectional shapes as shown in FIGS. 5 to 7. The web shown in FIG. 5 has a meandering configuration and the web 13 shown in FIG. 6 is undulated. The web 13 shown in FIG. 7 is provided on both sides with staggered coaxial transverse ribs 16.

As is shown in FIG. 4, the hubs 12 of the discs 11 are fitted on a rod 17, which is secured at its ends to the wheels 5, e.g. by means of fixing screws. One portion of each edge flange 14 is formed with a slot 18, which subtends an angle α of 15 to 25 degrees. The bisector of that angle is designated 19 in FIGS. 1 and 3.

Figure 8:
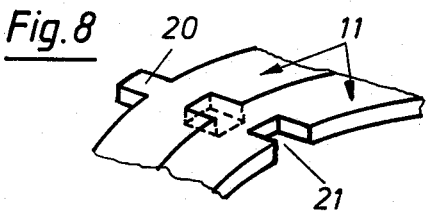
FIG. 8 is a perspective view showing the rims of two discs.

The discs 11 are so assembled that their slots 18 are axially aligned. The rod 17 is secured to the wheels 5 in such a manner when the discs are entering the liquid the slots face downwardly in a vertical direction so that the bisectors 19 of the slots are vertical (FIG. 1). In order to ensure that the slots 18 can easily be axially aligned as the discs 11 are assembled, each disc 11 may be formed in its edge portion with a tongue 20 and a groove 21, as is shown in FIG. 8. Such a tongue-and-groove joint may also be provided between the hubs 12 of adjacent discs 11.

In FIG. 1, the largest distance between the surface 10 of the liquid and the lowermost generatrix of an immersible body is designated b. That distance b is selected to amount to one to one-and a half times the diameter of the disc so that the wheels 5 can be immersed under the liquid surface 10 to an extent which may be as large as 86% of the outside diameter of the wheel 5.

What I claim is:

1. An aerator for liquids, particularly an aerator for water, said aerator comprising
at least one aerating basin, at least two coaxial wheels disposed in the aerating basin and revolving about an axis which is parallel to the surface of the liquid in the aerating basin, a plurality of immersible elongate bodies, which constitute a circular series, which is centered on said axis, and are angularly spaced apart, so that each of said immersible bodies emerges entirely out of the liquid on one side of the aerating basin and is entirely immersed into the liquid on the other side of the aerating base, and each of said immersible bodies comprises a plurality of axially aligned discs, each of which is formed at its rim with an axially and peripherally extending edge flange so that a chamber is defined between adjacent discs, and each of said flanges is formed with a slot in a portion which faces vertically downwardly as the disc enters the fluid, and that at least one of said extending edge flanges is stepped so that each of said discs is adapted to be fitted on another disc.

2. Apparatus according to claim 1, characterized in that the slot subtends an angle of 15 to 25 degrees.

3. Apparatus according to claim 1, characterized in that each disc comprises a hub and a web, which is formed with said edge flange and is zig-zag shaped in cross-section.

4. Apparatus according to claim 1, characterized in that each disc comprises a hub and a web, which is formed with said edge flange and is meander-shaped in cross-section.

5. Apparatus according to claim 1, characterized in that each disc comprises a hub and a web, which is undulated in cross-section.

6. Apparatus according to claim 1, characterized in that each disc comprises a hub and a web, which is provided on opposite sides with staggered coaxial transverse ribs.

7. Apparatus according to claim 1, characterized in that each disc comprises a stepped hub so that each of said discs is adapted to be fitted on another.

8. Apparatus according to claim 1, characterized in that each disc has an edge portion formed on one side with a tongue and on the other side with a groove.

9. An aerator for liquids as in claim 1, wherein a lowermost periphery of an uppermost body is spaced above the surface of the liquid at a distance 1.5 times the diameter of the bodies.

10. An aerator for liquids, said aerator comprising:
an aerating basin for containing a liquid,
at least two coaxial wheels located in said aerating basin, said wheels revolving about an axis aligned parallel to the surface of the liquid in said basin,
a plurality of immersible elongated bodies arranged in a circular series, said series being centered on said axis of said wheels, each of said bodies being angularly spaced apart so that each of said bodies emerges entirely out of the liquid on one side of the aerating basin and is entirely immersed into the liquid on another side of the aerating basin, and
each of said bodies includes a plurality of axially aligned discs having a web and an axially and peripherally extending edge flange defining a single radially extending chamber between each two adjacent discs and further having a slot defined in a portion of said flange communicating with each chamber for immediate air and liquid contact with an innermost wall of the chamber and said slot faces vertically downwardly as the discs enter the fluid, and at least one of said flanges are stepped so that adjacent discs fit together on one another.

11. An aerator according to claim 10, wherein a single slot is defined in each flange.

12. An aerator according to claim 11, wherein each slot subtends an arc of 15 to 25 degrees.

13. An aerator according to claim 10, wherein the slot subtends an arc of 15 to 25 degrees.

14. An aerator according to claim 10, wherein each disc includes a hub and said web, which is formed zig-zag-shaped in cross-section.

15. An aerator according to claim 10, wherein each disc comprises a hub and said web, which is formed meander-shaped in cross-section.

16. An aerator according to claim 10, wherein each disc comprises a hub and said web, which is undulated in cross-section.

17. An aerator according to claim 10, wherein each disc comprises a hub and said web, which is provided on opposite sides of said hub with staggered coaxial transverse ribs.

18. An aerator according to claim 10, wherein each disc comprises a stepped hub so that each of said discs is adapted to be fitted on another disc.

19. An aerator according to claim 10, wherein each disc has an edge portion formed on one side with a tongue and on the other side with a groove.

* * * * *